(12) United States Patent
Austin et al.

(10) Patent No.: US 11,722,411 B2
(45) Date of Patent: *Aug. 8, 2023

(54) SYSTEMS AND METHODS FOR ISOLATING NETWORK TRAFFIC OF MULTIPLE USERS ACROSS NETWORKS OF COMPUTING PLATFORMS

(71) Applicant: Palantir Technologies Inc., Denver, CO (US)

(72) Inventors: Steven Austin, Rego Park, NY (US); Matthew Williamson, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,081

(22) Filed: Nov. 17, 2021

(65) Prior Publication Data

US 2022/0078115 A1 Mar. 10, 2022

Related U.S. Application Data

(63) Continuation of application No. 16/288,029, filed on Feb. 27, 2019, now Pat. No. 11,212,224.

(Continued)

(51) Int. Cl.
*H04L 45/745* (2022.01)
*H04L 61/2592* (2022.01)

(52) U.S. Cl.
CPC ........ *H04L 45/745* (2013.01); *H04L 61/2592* (2013.01)

(58) Field of Classification Search
CPC .......................... H04L 45/745; H04L 61/2592
See application file for complete search history.

(56) References Cited

U.S. PATENT DOCUMENTS

| 6,396,833 B1 | 5/2002 | Zhang |
| 9,014,191 B1 | 4/2015 | Mandal et al. |

(Continued)

FOREIGN PATENT DOCUMENTS

EP  3687117 A1  7/2020

OTHER PUBLICATIONS

European Patent Office; Official Communication for Application No. 19184504.9; dated Nov. 26, 2019.

(Continued)

*Primary Examiner* — Kevin M Cunningham
(74) *Attorney, Agent, or Firm* — Faegre Drinker Biddle & Reath LLP

(57) ABSTRACT

System and method for isolating network traffic of multiple users across a network of a computing platform. For example, a method includes receiving data at a networking device of a computing platform. The networking device includes a plurality of routing tables. Each routing table of the plurality of routing tables is associated with a different user of multiple users of the computing platform. A user of the multiple users is identified based at least in part on the received data. In response to identifying the user of the multiple users based at least in part on the received data, a routing table of the plurality of routing tables is identified based at least in part on the identified user. A route from the identified routing table is determined based at least in part on the received data. The received data is sent across a network of the computing platform according to the determined route. The method is performed using one or more processors.

20 Claims, 6 Drawing Sheets

Related U.S. Application Data

(60) Provisional application No. 62/795,998, filed on Jan. 23, 2019.

(56) References Cited

U.S. PATENT DOCUMENTS

| | | | |
|---|---|---|---|
| 11,212,224 B1* | 12/2021 | Austin | ............ H04L 45/745 |
| 2001/0005368 A1 | 6/2001 | Rune | |
| 2006/0013209 A1 | 1/2006 | Somasundaram | |
| 2012/0123829 A1 | 5/2012 | Chen et al. | |
| 2015/0295824 A1 | 10/2015 | Chopra et al. | |
| 2015/0304934 A1 | 10/2015 | Malatack | |
| 2015/0326467 A1 | 11/2015 | Fullbright et al. | |
| 2016/0006794 A1 | 1/2016 | Acosta | |
| 2017/0353431 A1 | 12/2017 | Tjahjono et al. | |
| 2019/0306112 A1 | 10/2019 | Augustyn | |
| 2019/0387295 A1 | 12/2019 | Zhang et al. | |

OTHER PUBLICATIONS

Grant, Brian et al.; Kubernetes Architectural Roadmap; Apr. 20, 2017.

Kumar, Alok; BwE: Flexible, Hierarchical Bandwidth Allocation for WAN Distributed Computing; SIGCOMM 'Aug. 15, 2015.

Customizing DNS Services; from https://kubernetes.io/docs/tasks/administer-cluster/dns-custom-nameservers/; Mar. 4, 2021.

Open. For All.; from htttps://www.opencompute.org/; 2011.

Popeskic, Valter; NDP-Neighbor Discovery Protocol; from https://howdoesinternetwork.com/2012/ndp-ipv6-neighbor-discovery-protocol/; 2015.

Popeskic; Valter; IPv6—SLAAC Stateless Address Autoconfiguration; from https://howdoesinternetwork.com/2013/slaac; 2016.

Donaldson, Richard; DHCP for IPv4 vs. IPv2—What You Need to Know; Jun. 2, 2011.

Popeskic, Valter; IPv6—SLAAC EUI-64 Address Format; from https://howdoesinternetwork.com/2013/slaac-ipv6-stateless-address-autoconfiguration/; 2017.

Nordmark, E.; Stateless IP/ICMP Translation Algorithm (SIIT); Feb. 2000.

Container Network Interface (CNI) Specification; from https://github.com/containernetworking/cni/blob/master/SPEC.md#network-configuration; Jan. 6, 2021.

Kube-v6; from https://github.com/leblancd/kube-v6; 2021.

Noction Network Intelligence; IPv4 BGP vs IPv6 BGP; from https://www.noction.com/blog/ipv4-bgp-vs-ipv6-bgp; Feb. 6, 2015.

* cited by examiner

SYSTEMS AND METHODS FOR ISOLATING NETWORK TRAFFIC OF MULTIPLE USERS ACROSS NETWORKS OF COMPUTING PLATFORMS

CROSS REFERENCE TO RELATED APPLICATIONS

This application is a continuation of U.S. application Ser. No. 16/288,029, filed Feb. 27, 2019, which claims priority to U.S. Provisional Application No. 62/795,998, filed Jan. 23, 2019, both of which are incorporated by reference herein for all purposes.

BACKGROUND

Certain embodiments of the present invention are directed to computing platforms including hosts and networking devices. More particularly, some embodiments of the present invention provide systems and methods for isolating network traffic of multiple users across networks of computing platforms.

With the number of customers of a computing platform increasing, the demands on data security provided by the computing platform are also increasing. In some examples, customers are running their applications on multiple hosts across the computing platform sharing resources and the network of the computing platform. Thus, managing network traffic and ensuring data security across a computing platform becomes increasingly more complex with the number of customers increasing. For example, conventional computing platforms generally require extensive network configurations to isolate network traffic and data from multiple customers across a network of a computing platform. Examples of conventional network configurations include the use of firewalls and access control lists that are difficult to implement and manage for an increased number of customers of the platform.

Hence it is highly desirable to improve the techniques for isolating network traffic of multiple users associated with different customers across networks of computing platforms.

SUMMARY

Certain embodiments of the present invention are directed to computing platforms including hosts and networking devices. More particularly, some embodiments of the present invention provide systems and methods for isolating network traffic of multiple users across networks of computing platforms.

According to some embodiments, a method for isolating network traffic of multiple users across a network of a computing platform includes receiving data at a networking device of a computing platform. The networking device includes a plurality of routing tables. Each routing table of the plurality of routing tables is associated with a different user of multiple users of the computing platform. The method further includes identifying a user of the multiple users based at least in part on the received data. In response to identifying the user of the multiple users based at least in part on the received data, a routing table of the plurality of routing tables is identified based at least in part on the identified user. The method further includes determining a route from the identified routing table based at least in part on the received data, and sending the received data across a network of the computing platform according to the determined route. The method is performed using one or more processors.

According to certain embodiments, a system for isolating network traffic of multiple users across a network of a computing platform includes a plurality of hosts, a networking device, and a network connecting the plurality of hosts and the networking device. The networking device includes a network layer and a plurality of routing tables. Each routing table of the plurality of routing tables is associated with a different user of multiple users of a computing platform. The networking device is configured to: receive data at the network layer from a first host of the plurality of hosts; identify a user of the multiple users based at least in part on the received data; in response to identifying the user of the multiple users based at least in part on the received data, identify a routing table of the plurality of routing tables based at least in part on the identified user; determine a route from the identified routing table based at least in part on the received data; and send the received data according to the determined route across the network to a second host of the plurality of hosts.

According to some embodiments, a network layer for isolating network traffic of multiple users of a computing platform is provided. The network layer is configured to: identify a user of multiple users of a computing platform based at least in part on network data send across a network of the computing platform; in response to identifying the user of the multiple users based at least in part on the network data send across the network of the computing platform, identify a routing table of a plurality of routing tables based at least in part on the identified user. Each routing table of the plurality of routing tables are associated with a different user of the multiple users of the computing platform. The network layer is further configured to: determine a route from the identified routing table based at least in part on the network data; and route the network data according to the determined route across the network of the computing platform.

Depending upon embodiment, one or more benefits may be achieved. These benefits and various additional objects, features and advantages of the present invention can be fully appreciated with reference to the detailed description and accompanying drawings that follow.

DETAILED DESCRIPTION

Figure 1:
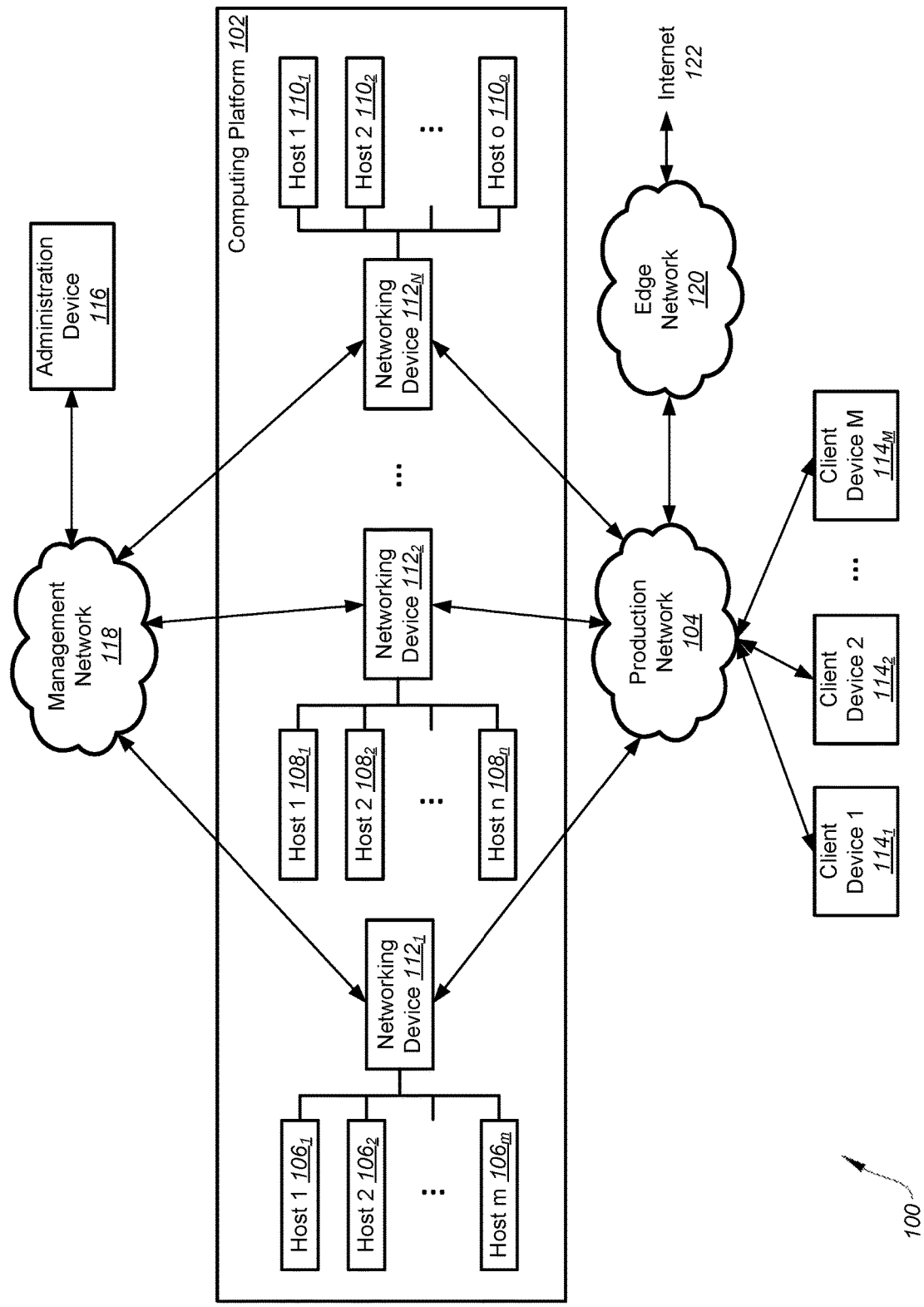
FIG. 1 is a simplified diagram showing a system for isolating network traffic of multiple users across a network of a computing platform according to one embodiment of the present invention.

Conventional systems and methods are often not capable of efficiently isolating network traffic of multiple users associated with different customers across a network of a computing platform. Conventional systems and methods typically use firewalls and access control lists to guarantee data security of network traffic at the network layer within a multi-tenant computing platform, which leads to increased cost and decreased efficiency, and is more difficult to manage when scaling up the platform.

In some embodiments, benefits include significant improvements, including, for example, increased efficiency, reduced complexity, and improved scalability, in managing network traffic of an increased number of users across a network of a computing platform. In certain embodiments, other benefits include increased data security at the networking level of the computing platform. In some embodiments, systems and methods are configured to isolate network traffic of multiple users across a network of a computing platform.

In certain embodiments, one or more solutions rooted in computer technology overcome one or more problems specifically arising in the realm of computer technology. Some embodiments are directed to computing platforms including hosts and networking devices. More particularly, some embodiments of the present invention provide systems and methods for isolating network traffic of multiple users across networks of computing platforms. In some examples, the computing platforms include virtual servers or virtual machines. In certain examples, the computing platforms include a virtual computing environment that provides an operating system and/or an application server for running one or more containers. For example, a container includes a containerized application. In some examples, one or more containers run on a server or host machine of the computing platform and are associated with particular resources that include CPU, memory, storage, and/or networking capacity.

According to some embodiments, network traffic for multiple users associated with different customers (e.g., different tenants) of a multi-tenant computing platform is isolated at the network layer of the network by having separate routing tables for each user. This, for example, eliminates the need for firewalls and access control lists to guarantee data security in the multi-tenant computing platform. In some examples, a user represents a group of users. As an example, the group of users is associated with a customer (e.g., a tenant) of the multi-tenant computing platform. In some examples, each user is associated with only one customer (e.g., only one tenant) of the multi-tenant computing platform that provides services to multiple customers. In certain examples, each routing table is associated with a unique user identification number to isolate network routes in one routing tables from routes in another routing table based at least in part on the unique user identification number. In some examples, the routing tables reside on networking devices of the computing platform, which direct data packets tagged with the unique user identification number based on routes in the routing table associated with the same unique user identification number. In certain examples, the unique user identification number represents a unique customer identification number.

According to certain embodiments, the isolation of routes at the network layer of the network mirrors the isolation of broadcast domains of the computing platform at the data link layer of the network. In some examples, the isolation at the data link layer is based on the same unique user identification number and extended over the network layer of the network. In other examples, systems and methods allow for leaking routes between separate routing tables and sharing default routes with all user of the computing platform. For example, each separate routing table are associated with a different unique user identification number. In some examples, configuration of networking devices, including configuration of the routing tables on the networking devices, is managed through a management network that is separate from the network used by the users' network traffic.

FIG. 1 is a simplified diagram showing a system 100 for isolating network traffic of multiple users across a network of a computing platform 102 according to one embodiment of the present invention. This diagram is merely an example, which should not unduly limit the scope of the claims. One of ordinary skill in the art would recognize many variations, alternatives, and modifications. The system 100 includes the computing platform 102, a network 104 (e.g., a production network), a plurality of hosts $106_{1-m}$, $108_{1-n}$, $110_{1-o}$, and one or more networking devices $112_{1-N}$. In some examples, hosts $106_{1-m}$ represent hosts $106_1, \ldots, 106_m$ as shown in FIG. 1, hosts $108_{1-n}$ represent hosts $108_1, \ldots, 108_n$ as shown in FIG. 1, hosts $110_{1-o}$ represent hosts $110_1, \ldots, 110_O$ as shown in FIG. 1, and networking devices $112_{1-N}$ represent networking devices $112_1, \ldots, 112_N$ as shown in FIG. 1.

In some embodiments, the computing platform 102 further includes one or more client devices $114_{1-M}$, an administration device 116, a network 118 (e.g., a management network), and/or a network 120 (e.g., an edge network). For example, client devices $114_{1-M}$ represent client devices $114_1, \ldots, 114_M$ as shown in FIG. 1. As an example, the one or more devices $114_{1-M}$ are associated with a customer. In some examples, the network 120 (e.g., the edge network) is configured to connect the network 104 (e.g., the production network) to the Internet 122. In certain examples, the network 118 (e.g., the management network) is configured to connect the administration device 116 to the plurality of hosts $106_{1-m}$, $108_{1-n}$, $110_{1-o}$, and the one or more networking devices $112_{1-N}$. For example, the network 118 (e.g., the management network) is configured to connect the administration device 116 to the one or more networking devices $112_{1-N}$. As an example, the administration device 116 is configured to allow an administrator of the computing platform 102 to administer and/or configure the plurality of hosts $106_{1-m}$, $108_{1-n}$, $110_{1-o}$ and/or the one or more networking devices $112_{1-N}$. In certain examples, the network 104 (e.g., the production network) is configured to connect the one or more client devices $114_{1-M}$, the plurality of hosts $106_{1-m}$, $108_{1-n}$, $110_{1-o}$ and the one or more networking devices $112_{1-N}$ with each other. For example, the network 104 (e.g., the production network) is configured to connect the one or more client devices $114_{1-M}$ and the one or more networking devices $112_{1-N}$ with each other. As an example, the networking devices $112_1$, $112_2$, and $112_N$ are connected to hosts $106_{1-m}$, hosts $108_{1-n}$, and hosts $110_{1-o}$, respectively.

In certain embodiments, the network 104 (e.g., the production network) is configured to transmit all non-management communications, including, for example, network traffic from users or tenants and/or control plane traffic of a control plane application. For example, the computing platform 102 includes a control plane application configured to schedule and manage applications that run on the plurality of hosts $106_{1-m}$, $108_{1-n}$, $110_{1-o}$. In certain examples, the network 104 (e.g., production network) includes at least three networking layers (e.g., a physical layer or layer 1, a data link layer or layer 2, and a network layer or layer 3). For example, the network 104 (e.g., the production network) includes an IPv4 network, an IPv6 network, or any combination thereof.

According to some embodiments, the network 118 (e.g., the management network) is configured to boot (e.g., to PXE boot) the operating system on one or more components (e.g., one or more hosts of the hosts $106_{1-m}$, $108_{1-n}$, $110_{1-o}$ and/or one or more networking devices of the networking devices $112_{1-N}$) of the computing platform 102. In some examples, the network 118 (e.g., the management network) is configured to perform and manage certain functions of the computing platform 102, including, for example, functions related to a network time protocol (NTP) and/or an intelligent platform management interface (IPMI). In certain examples, the network 118 (e.g., the management network) includes at least three networking layers (e.g., a physical layer or layer 1, a data link layer or layer 2, and a network layer or layer 3). For example, the network 118 (e.g., the management network) includes an IPv4 network, an IPv6 network, or any combination thereof.

According to certain embodiments, the network 120 (e.g., the edge network) is configured to transmit traffic from carrier drops associated with pods and/or applications running on devices and/or servers (e.g., hosts $106_{1-m}$, $108_{1-n}$, $110_{1-o}$) of the network 104 (e.g., the production network). In some examples, the network 120 (e.g., the edge network) includes at least three networking layers (e.g., a physical layer or layer 1, a data link layer or layer 2, and a network layer or layer 3).

In some embodiments, the computing platform 102 includes a cluster computing platform including clusters of the one or more server or host machines (e.g. clusters of the hosts $106_{1-m}$, $108_{1-n}$, $110_{1-o}$). In some examples, the computing platform 102 includes a distributed computing platform that allows the one or more device clients $114_{1-m}$ to distribute applications and/or data over the network 104 (e.g., the production network) to the cluster of servers or host machines (e.g. the clusters of the hosts $106_{1-m}$, $108_{1-n}$, $110_{1-o}$). In certain examples, the computing platform 102 includes a cloud computing platform that allows the one or more device clients $114_{1-M}$ access to remote servers, data storages, networks, devices, applications and/or data resources over the network 104 (e.g., the production network). For example, multiple users through the one or more client devices $114_{1-M}$ store data at the data storages of the cloud computing platform. In other examples, the computing platform 102 is associated with a platform provider that provides the platform to multiple customers. For example, customers of the computing platform 102 include individuals, organizations and/or commercial companies.

In some embodiments, the one or more servers or host machines (e.g., the plurality of hosts $106_{1-m}$, $108_{1-n}$, $110_{1-o}$ and/or the networking devices $112_1$, $112_2$, $112_N$) are divided into in one or more regions. For example, a region represents a geographic area that the one or more servers or host machines are located within. As an example, each region relates to a different geographic area. In other examples, each region of the one or more servers or host machines includes one or more separate zones. For example, each server or host machine within a region is associated with only one zone of the one or more separate zones associated with the region. As an example, each zone within a region are isolated from any other zone within the region. In one example, each zone within a region is connected with any other zone within the region through low-latency links. In some examples, the computing platform 102 is configured to not replicate applications and/or resources across different regions. For example, each region is completely independent from any other region of the computing platform 102.

In certain embodiments, the computing platform 102 includes a container-orchestration platform. In some examples, the container-orchestration platform allows for automated deployment, scaling and/or operations of containers across the platform. For example, the container-orchestration platform employs the containers across the one or more servers or host machines of the computing platform 102. In some example, a pod of the computing platform 102 represents a basic scheduling unit of work on the computing platform 102. In certain examples, the pod includes one or more containers. In other examples, one or more pods of the computing platform 102 provide a service to the one or more client devices $114_{1-M}$. For example, each of the one or more client devices $114_{1-M}$ is associated with a customer of the multi-tenant computing platform 102.

According to some embodiments, a container of the computing platform 102 includes one or more applications. In some examples, the container also includes data and libraries associated with the one or more applications. For example, the container allows the one and more applications and their associated data and libraries to be co-located on the same server or host machine (e.g., the same host of the plurality of hosts $106_{1-m}$, $108_{1-n}$, $110_{1-o}$). In one example, the container allows the one and more applications and their associated data and libraries to share resources. For example, the shared resources include CPU, memory, storage, and/or networking capacity. As an example, the container represents the lowest level of a micro-service of the computing platform 102. In one example, the micro-service includes the one or more applications, libraries and the applications' dependencies.

In some embodiments, the computing platform 102 includes a plurality of racks. In some examples, each rack of the plurality of racks includes one or more hosts and a networking device. For example, the computing platform 102 includes N racks with the first rack including the networking device $112_1$ and the hosts $106_{1-m}$, the second rack including the networking device $112_2$ and the hosts 108 and the Nth rack including the networking device $112_N$ and the hosts $110_{1-o}$. In certain examples, the networking devices $112_{1-N}$ of the racks include top of rack (ToR) switches. For example, the physical layer of the network 118 (e.g., the management network) includes a 48×1GE ToR switch for each rack. As an example, each ToR switch of the network 118 (e.g., the management network) includes north-bound connections to a 2× aggregation switch running in the core. In some examples, each compute node (e.g., each host) in the rack is connected to a ToR switch of the physical layer of the network 118 (e.g., the management network) via an on-board 1GE network interface controller (NIC).

In certain embodiments, the data link layer of the network 118 (e.g., the management network) includes at least three virtual local area networks (VLANs) that span the entire network 118 (e.g., the entire management network). For example, the first VLAN includes an untagged VLAN used for PXE booting. As an example, the second VLAN includes a vlan 100 used for IPMI functions. In one example, the third VLAN includes a vlan 200 used for core management network services. In some examples, the default on the ToR switches of the network 118 (e.g., the management network) are configured to forward dynamic host configuration protocol (DHCP) requests so that DHCP spans all three VLANs.

According to some embodiments, the network layer of the network 118 (e.g., the management network) includes a /24 subnets. For example, each ToR switch of the network 118 (e.g., the management network) is assigned to a /24 subnet. In some examples, the computing platform 102 is configured to statically assign the internet protocol (IP) addresses of the network 118 (e.g., the management network) via DHCP service in core which allows assigning hostnames via internal domain name system (DNS).

According to certain embodiments, the network 104 (e.g., the production network) of computing platform is configured to provide connectivity via the border gateway protocol (BGP) and virtual routing and forwarding (VRF) technology over an ethernet virtual private network (EVPN). For example, the EVPN is implemented using VPN technology and virtual extensible local area network (VXLAN) technology to create virtual MAC addresses for the Lo interfaces that allows network traffic to be forwarded to the MAC address. In some examples, the network 104 (e.g., the production network) of computing platform includes point-to-point open shortest path first (OSPF) routing algorithm to make the Lo interface routable for BGP. In certain examples, the network 104 (e.g., the production network) of computing platform includes loopback interfaces for peer BGP sessions across racks to allow BGP to flow across any active interface of the network 104 (e.g., the production network). In certain examples, the physical layer of the network 104 (e.g., the production network) includes 32×100GE ToR layer 3 switches for each rack. For example, each compute node (e.g., each host) of the racks is connected via 2×25GE QSFP28+ to a ToR switch of the network 104 (e.g., the production network). As an example, each ToR switch of the network 104 (e.g., the production network) includes northbound connections to 2× aggregations running in the core. In one example, for the VO, each ToR switch of the network 104 (e.g., the production network) includes 2×100G uplinks to each aggregator for providing a 2:1 oversubscription.

Figure 2:
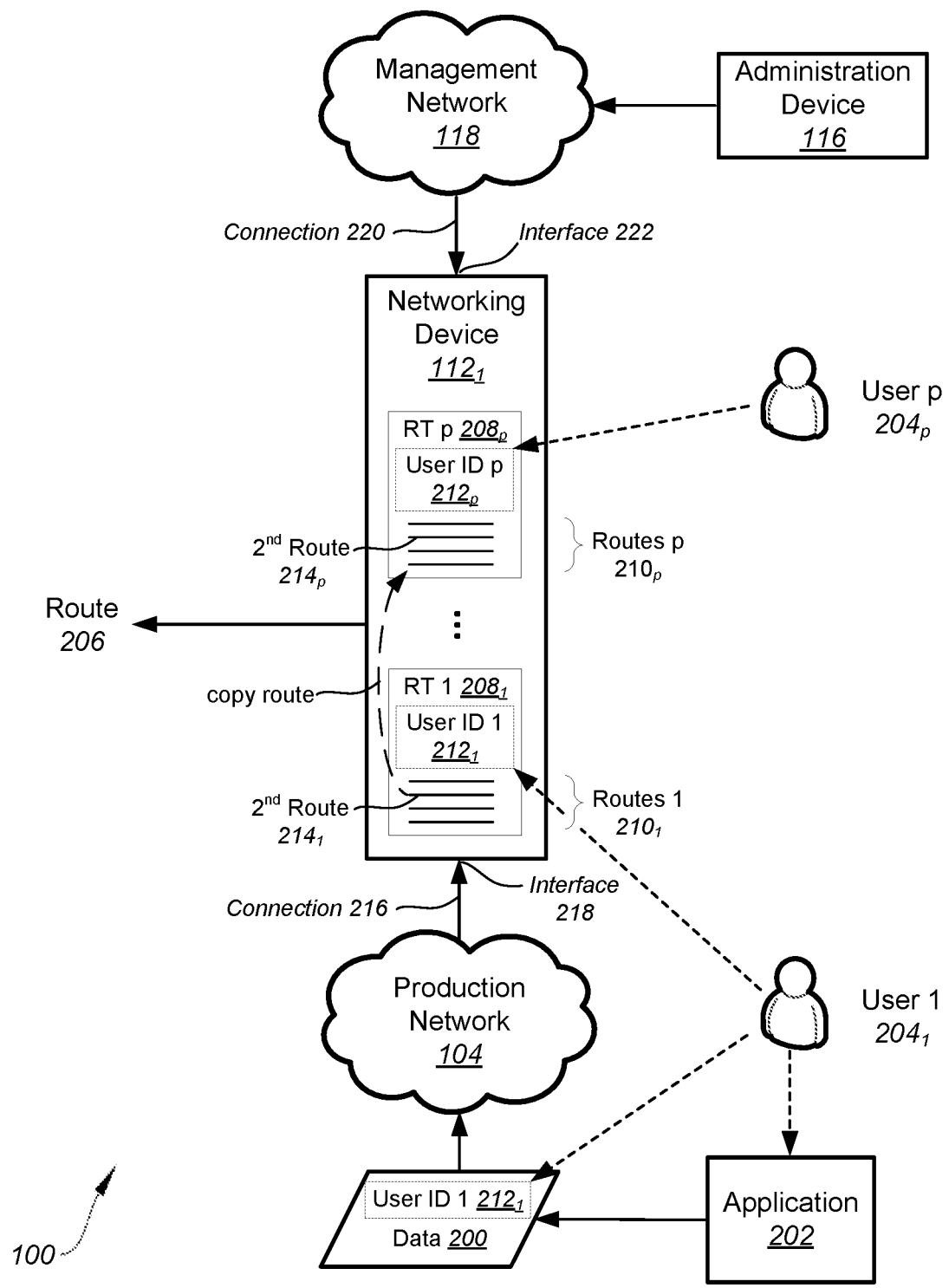
FIG. 2 is a simplified diagram showing the computing platform as part of the system for isolating network traffic of multiple users across the network as shown in FIG. 1 according to one embodiment of the present invention.

FIG. 2 is a simplified diagram showing the computing platform 102 as part of the system 100 for isolating network traffic of multiple users across the network 104 as shown in FIG. 1 according to one embodiment of the present invention. This diagram is merely an example, which should not unduly limit the scope of the claims. One of ordinary skill in the art would recognize many variations, alternatives, and modifications. In some examples, the networking device $112_1$ is configured to receive data 200. For example, an application 202 associated with a user $204_1$ is configured to send the data 200 to the networking device $112_1$ for forwarding the data 200 according to a route 206 across the network 104 (e.g., the production network). In some examples, the user $204_1$ represents a group of users associated with a customer of the computing platform 102. In certain examples, the networking device $112_1$ includes a plurality of routing tables $208_{1-p}$. For example, routing tables $208_{1-p}$ represent routing tables $208_1$, . . . , $208_p$ as shown in FIG. 2. In other examples, the routing tables $208_{1-p}$ includes one or more routes $210_{1-p}$ for routing the data 200 across the network 104 (e.g., the production network). As an example, routes $210_{1-p}$ represent routes $210_1$, . . . , $210_p$ as shown in FIG. 2. In one example, each of the routes $210_1$, . . . , $210_p$ include one or more routes.

In some embodiments, each routing table of the plurality of routing tables $208_{1-p}$ is associated with a different user of multiple users $204_{1-p}$ of the computing platform 102. For example, users $204_{1-p}$ represent users $204_1$, . . . , $204_p$ as shown in FIG. 2. In certain examples, each routing table of the plurality of routing tables $208_{1-p}$ is associated with a unique user identification number 212. For example, the unique user identification number $212_1$ relates to user $204_1$ of the multiple users $204_{1-p}$ of the computing platform 102. In some examples, each routing table of the plurality of routing tables $208_{1-p}$ is associated with a different customer of the multi-tenant computing platform 102. For example, user $204_1$ represents a group of users associated with a customer of the multi-tenant computing platform 102. As an example, the unique user identification number $212_1$ represents a unique customer identification number associated with the customer.

In certain embodiments, the networking device $112_1$ is configured to identify the user $204_1$ of the multiple users $204_{1-p}$ of the computing platform 102 based on the received data 200. For example, the received data 200 includes the unique user identification number $212_1$ relating to the user $204_1$. In some examples, the user $204_1$ represents a group of users associated with a customer of the multi-tenant computing platform 102. For example, the unique identification number $212_1$ represents a unique customer identification number associated with the customer. In certain examples, the networking device 112 is configured, in response to identifying the user $204_1$, identify a routing table $208_1$ of the plurality of routing tables $208_{1-p}$ based at least in part on the identified user $204_1$. For example, networking device 112 is configured to identify the routing table $208_1$ based on the unique user identification number $212_1$ associated with the user $204_1$. As an example, the identified routing table $212_1$ includes the unique identification number $212_1$ associated with the user $204_1$. In one example, the networking device 112 is configured to extract the unique user identification number $212_1$ from the received data 200 and identify the routing table $208_1$ associated with the extracted unique user identification number $212_1$.

According to some embodiments, the networking device $112_1$ is configured to determine the route 206 from the identified routing table $208_1$ based at least in part on the received data 200. For example, the received data 200 includes a unique route identification number. In some examples, the networking device 112 is configured to extract the unique route identification number (e.g., "2") from the received data 200 and map the unique route identification number (e.g., "2") to the route $214_1$ (e.g., $2^{nd}$ route) of the identified routing table $208_1$. For example, the route $214_1$ represents the route 206 determined by the networking device 112. In certain examples, each route included in a routing table is associated with a unique route identification number (e.g., "1" for $1^{st}$ route, "2" for $2^{nd}$ route, etc.). In one example, the route $214_1$ represents the determined route 206. In other examples, the routing table $208_1$ associated with user $204_1$ includes the route $214_1$ and the routing table $208_p$ associated with user $204_p$ includes the route $214_p$. For the example, the route $214_1$ and the route $214_p$ are different. As an example, the route $214_1$ and the route $214_p$ are the same and relate to a default route. In other examples, the routes $210_1$ of the routing table $208_1$ associated with user $204_1$ are different from the routes $210_p$ of the routing table $208_p$ associated with user $204_p$.

According to certain embodiments, the networking device $112_1$ is configured to change the routing table $208_1$ in response to receiving a configuration request from the administration device 116 via the network 118 (e.g., the management network). For example, the network 104 (e.g., the production network) includes one or more network connections 216 and one or more network interfaces 218. As an example, the network 118 (e.g., the management network) includes one or more network connections 220 and one or more network interfaces 222. In some examples, the one or more network connections 216 and the one or more network connections 220 are different. In certain examples, the one or more network interfaces 218 and the one or more network interfaces 222 are different.

In some embodiments, the networking device $112_1$ is configured to configure the routing table $208_1$ via the network 118 (e.g., the management network). In some examples, the networking device $112_1$ is configured to prevent configuring the routing table $208_k$ via the network 104 (e.g., the production network). In certain examples, the networking device $112_1$ is configured to copy the route $214_1$ from the routing table $208_1$ associated with user $204_1$ into the routing table $208_p$ associated with user $204_p$. For example, user $204_1$ and user $204_p$ represent different users of the computing platform 102. In other examples, user $204_1$ and user $204_p$ represent two groups of users of the computing platform 102. For example, each group of users is associated with a different customer of the multi-tenant computing platform 102. As an example, the two groups of users associated with different customers do not share any common user. In some examples, the networking device $112_1$ is configured to, in response to user $204_1$ granting permission to user $204_p$, copy the route $204_1$ from the routing table $208_1$ into the routing table $208_p$.

In certain embodiments, the data link layer of the network 104 (e.g., the production network) includes layer 2 isolation on a per-user basis by assigning each user to a separate VLAN. For example, ToR ports of the network 104 (e.g., the production network) that are connecting down to the compute nodes include 802.1q trunks for carrying multiple VLANs. As an example, each compute node (e.g., each host) includes at least two VLANs with one VLAN for the control plane application and the other VLAN for the containers running on the compute node (e.g., the host).

According to some embodiments, the network layer of the network 104 (e.g., the production network) includes layer 3 isolation on a per-user, per-host basis to prevent undesired IP communication between different users of the computing platform 102. In some examples, the layer 3 (L3) isolation is implemented using VRF tables and type-5 BGP sessions. For example, the networking devices 112 (e.g., the ToR switches) of the computing platform 102 are configured to assign each L3 user interface to a VRF table. In certain examples, the networking devices 112 (e.g., the ToR switches) are configured to assign each user a unique route identifier that is unique within the networks of the computing platform 102 and provides for per-user route injection into the VRF tables. For example, for each user the unique route identifier is associated with the unique user identification number. In other examples, the network 104 (e.g., the production network) of computing platform 102 is configured to use type-5 BGP sessions for propagating routes between ToR switches within the context of VRF to allow for cross-rack communication while maintaining L3 isolation. For example, the networking devices 112 are configured to inject tagged routes into VRF tables as part of an BGP session. As an example, the route identifiers are unique across the BGP session propagation. In other examples, each VRF table includes a unique VRF identifier associated with a particular user of the computing platform 102. For example, the unique VRF identifiers are local for each ToR switch.

Figure 3:
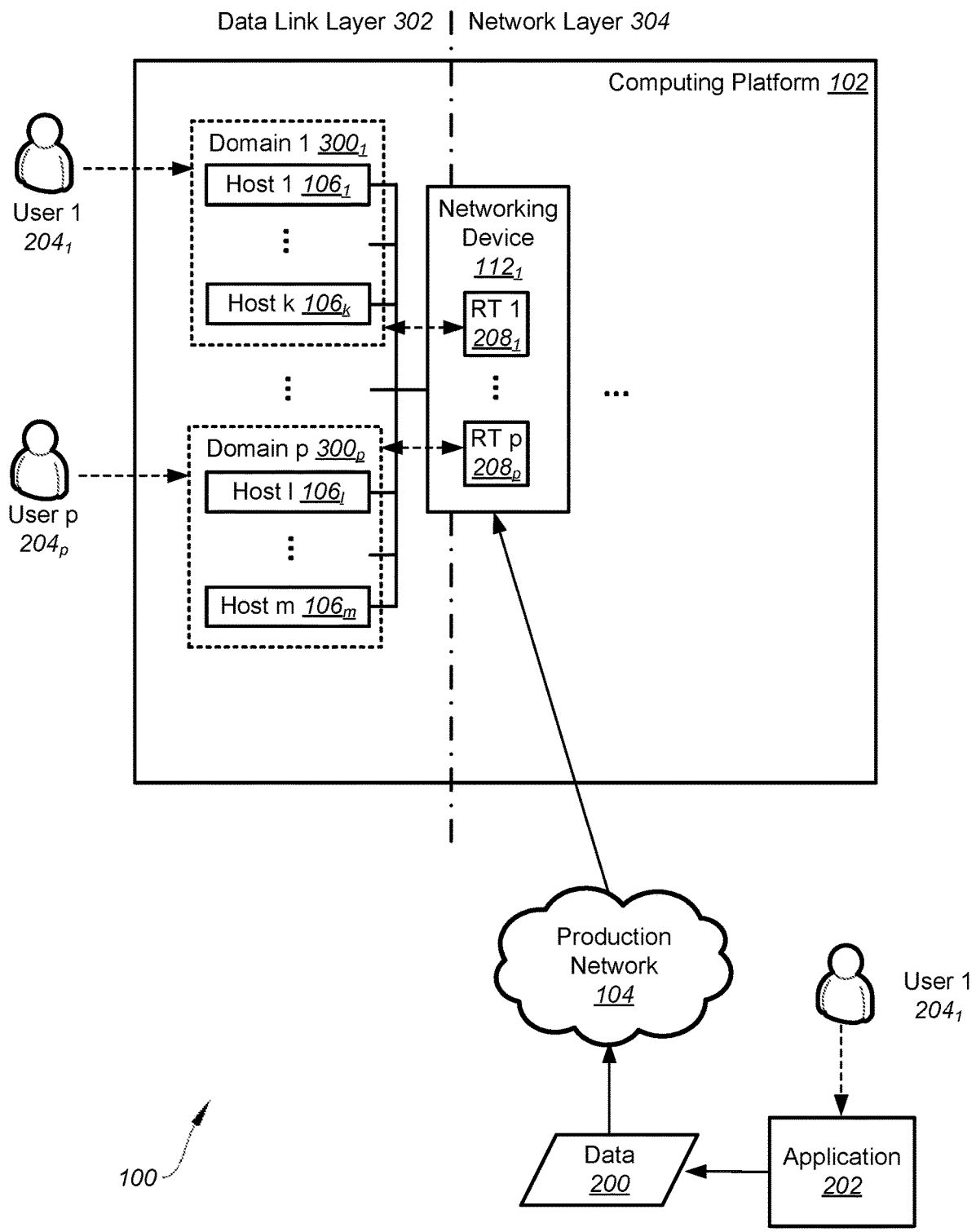
FIG. 3 is a simplified diagram showing the computing platform as part of the system for isolating network traffic of multiple users across the network as shown in FIG. 1 according to one embodiment of the present invention.

FIG. 3 is a simplified diagram showing the computing platform 102 as part of the system 100 for isolating network traffic of multiple users across the network 104 as shown in FIG. 1 according to one embodiment of the present invention. This diagram is merely an example, which should not unduly limit the scope of the claims. One of ordinary skill in the art would recognize many variations, alternatives, and modifications. In some examples, the network 104 (e.g., production network) of the computing platform 102 includes a plurality of broadcast domains $300_{1-p}$. For example, broadcast domains $300_{1-p}$ represent broadcast domains $300_1, \ldots, 300_p$ as shown in FIG. 3. In certain examples, each broadcast domain of the plurality of broadcast domains $300_{1-p}$ is isolated from any other broadcast domain of the plurality of broadcast domains $300_{1-p}$. As an example, each broadcast domain includes different hosts of the computing platform 102. In one example, the broadcast domain $300_1$ includes the hosts $106_{1-k}$ and the broadcast domain $300_p$ includes the hosts $106_{1-m}$.

In some embodiments, each broadcast domain 300 is associated with a user of the multiple users of the computing platform 102. For example, each broadcast domain of the broadcast domains $300_{1-p}$ is associated with a different user of the multiple users $204_{1-p}$ of the computing platform 102. In some examples, a user of the multiple users $204_{1-p}$ represents a group of users associated with a customer of the multi-tenant computing platform 102. For example, each broadcast domain of the broadcast domains $300_{1-p}$ is associated with only one customer of the multi-tenant computing platform 102. In certain examples, each broadcast domain of the broadcast domains $300_{1-p}$ is associated with only one routing table of the routing tables $208_{1-p}$ of the networking device $112_1$. For example, each broadcast domain is associated with a different routing table. As an example, broadcast domain $300_1$ is associated with routing table $208_1$ and broadcast domain $300_p$ is associated with routing table $208_p$. In other examples, the broadcast domains $300_{1-p}$ include virtual local area networks.

In certain embodiments, the broadcast domains $300_{1-p}$ are isolated from each other at a data link layer 302 of the network 104. In some examples, each broadcast domain includes a unique domain identification number. For example, the broadcast domain $300_1$ is associated with the domain identification number "1". As an example, the broadcast domain $300_p$ is associated with the domain identification number "p".

According to some embodiments, the networking device $112_1$ is configured to tag the received data 200 for sending across a broadcast domain of the plurality of broadcast domains $300_{1-p}$. For example, the networking device $112_1$ is configured to receive, at a network layer 304 of the computing platform 102, the data 200 from an application 202 associated with user $204_1$ via the network 104 (e.g., the production network). In some examples, the networking device $112_1$ is configured to identify user $204_1$ associated with the data 200 and send the data 200 across the broadcast domain $300_1$ associated with user $204_1$.

Figure 4:
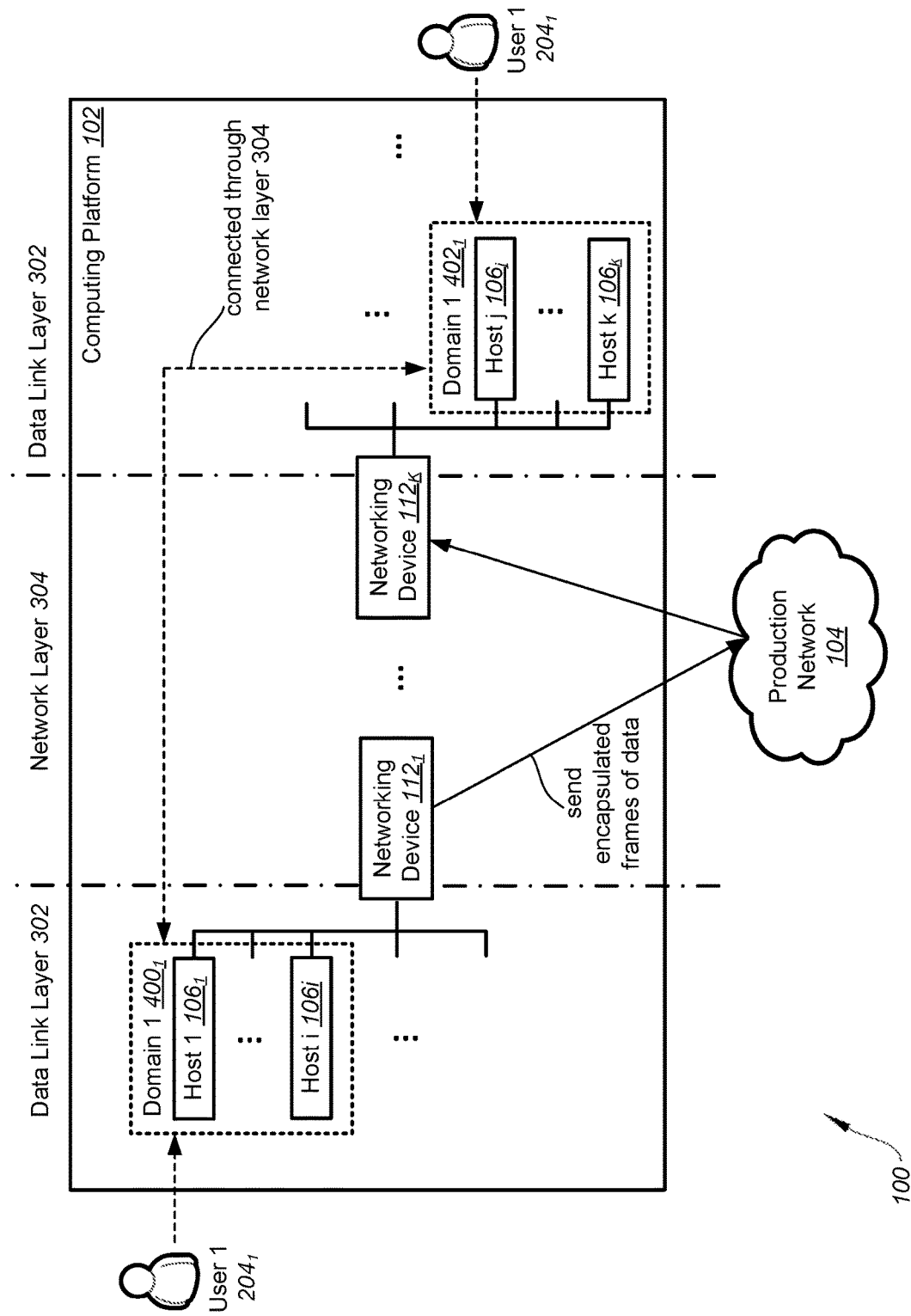
FIG. 4 is a simplified diagram showing the computing platform as part of the system for isolating network traffic of multiple users across the network as shown in FIG. 1 according to one embodiment of the present invention.

FIG. 4 is a simplified diagram showing the computing platform 102 as part of the system 100 for isolating network traffic of multiple users across the network 104 as shown in FIG. 1 according to one embodiment of the present invention. This diagram is merely an example, which should not unduly limit the scope of the claims. One of ordinary skill in the art would recognize many variations, alternatives, and modifications. In some examples, the network 104 (e.g., production network) of the computing platform 102 includes a plurality of broadcast domains. For example, each broadcast domain of the plurality of broadcast domains is isolated from any other broadcast domain of the plurality of broadcast domains at the data link layer 302 of the network 104.

In some embodiments, each broadcast domain includes different hosts of the computing platform 102. For example, the broadcast domain $400_1$ includes the hosts $106_{1-i}$. As an example, the broadcast domain $402_1$ includes the hosts $106_{j-k}$. In one example, hosts $106_{j-k}$ represent hosts $106_1, \ldots, 106_k$ as shown in FIG. 4. In some examples, each broadcast domain of the plurality of broadcast domains is associated with only one user of the multiple users of the computing platform 102. For example, each broadcast domain is associated with a different user of the multiple users of the computing platform 102. In certain examples, a user of the multiple users represents a group of users associated with a customer of the multi-tenant computing platform 102. For example, each broadcast domain is associated with only one customer of the multi-tenant computing platform 102.

In certain embodiments, the networking device $112_1$ is configured to encapsulate frames of data for sending from the broadcast domains $400_1$ to the broadcast domain $402_1$. In some examples, the broadcast domain $400_1$ and the broadcast domain $402_1$ are connected through the network layer 304 of the network 104. In certain examples, the broadcast domain $400_1$ and the broadcast domain $402_k$ are associated with user $204_1$. In other examples, user $204_1$ represents a group of users associated with a customer of the multi-tenant computing platform 102, and the broadcast domain $400_1$ and the broadcast domain $402_k$ are associated with the customer. In some examples, the broadcast domain $400_1$ is connected to the networking device $112_1$ at the data link layer of the network 104 (e.g., the production network). In certain examples, the broadcast domain $402_k$ is connected to the networking device $112_k$ at the data link layer of the network 104 (e.g., the production network). In other examples, the networking device $112_1$ is configured to send the encapsulated frames of the data from the broadcast domains $400_1$ to the broadcast domain $402_k$ using the network layer 304 of the network 104.

According to some embodiments, each frame encapsulated by the networking device $112_1$ includes a network address associated with the broadcast domain $400_1$ and a network address associated with the broadcast domain $402_1$. In some examples, the broadcast domain $400_1$ includes a domain identification number (e.g., "1"). In certain examples, the broadcast domain $402_k$ includes a domain identification number (e.g., "1"). For example, the domain identification number of the broadcast domain $400_1$ and the domain identification number of the broadcast domain $402_1$ are the same (e.g., "1"). As an example, the domain identification number of the broadcast domain $400_1$ and the domain identification number of the broadcast domain $402_1$ are associated with a unique identification number related to user $204_1$. In some examples, user $204_1$ represents a group of users associated with a customer of the multi-tenant computing platform 102, and the unique identification number relates to the customer.

Figure 5:
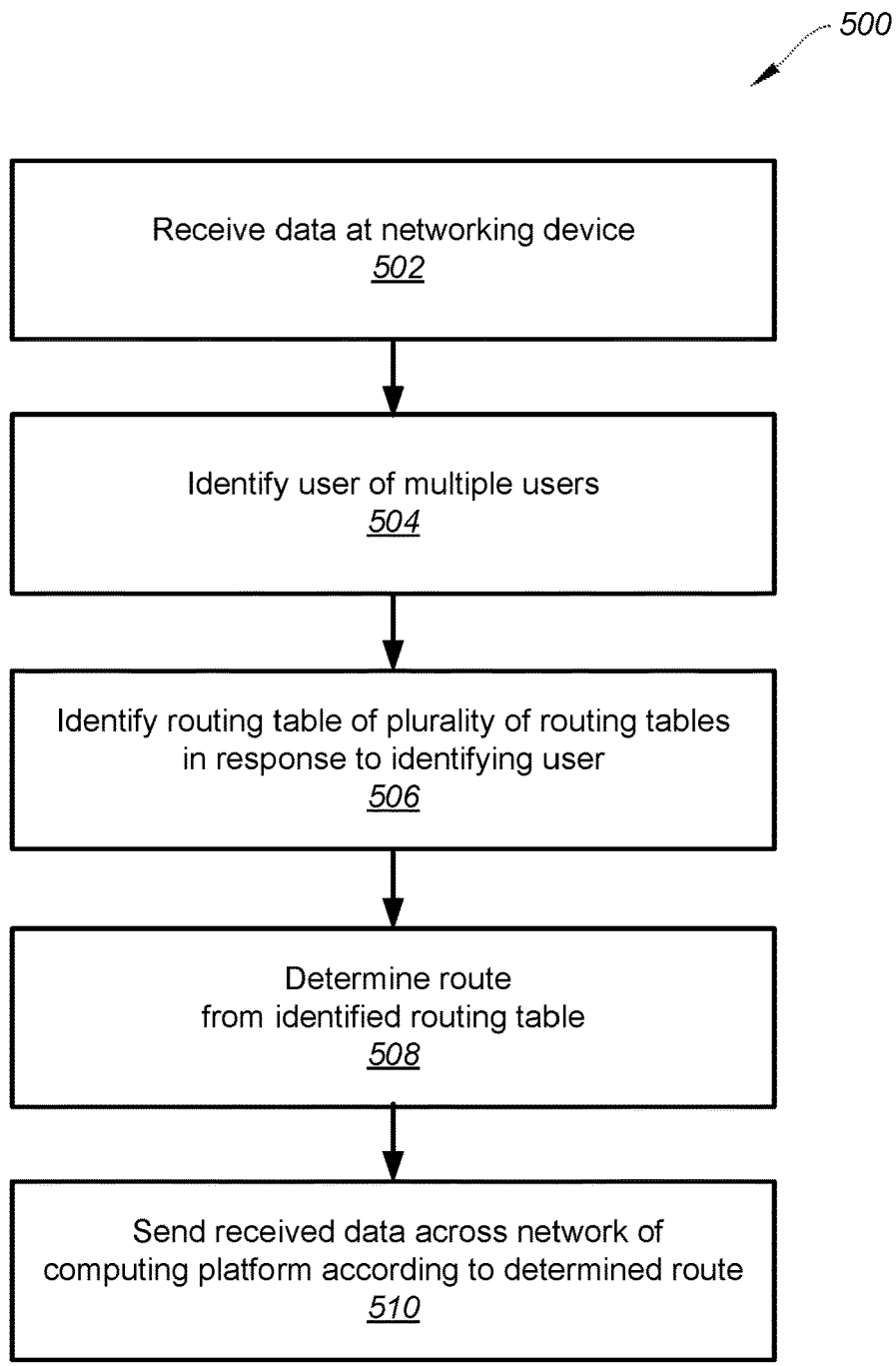
FIG. 5 is a simplified diagram showing a method for isolating network traffic of multiple users across a network of a computing platform according to one embodiment of the present invention.

FIG. 5 is a simplified diagram showing a method for isolating network traffic of multiple users across a network of a computing platform according to one embodiment of the present invention. This diagram is merely an example, which should not unduly limit the scope of the claims. One of ordinary skill in the art would recognize many variations, alternatives, and modifications. The method 500 includes processes 502-510 that are performed using one or more processors. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 500 are performed by the system 100. In certain examples, some or all processes (e.g., steps) of the method 500 are performed by a computer and/or a processor directed by a code. For example, a computer includes a server computer and/or a client computer (e.g., a personal computer). In some examples, some or all processes (e.g., steps) of the method 500 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some embodiments, at the process 502, data is received at a networking device of a computing platform. For example, the networking device includes a plurality of routing tables. As an example, each routing table of the plurality of routing tables are associated with a different user of multiple users of the computing platform. At the process 504, a user of the multiple users is identified based at least in part on the received data. At the process 506, in response to identifying the user of the multiple users based at least in part on the received data, a routing table of the plurality of routing tables is identified based at least in part on the identified user. At the process 508, a route from the identified routing table is determined based at least in part on the received data. At the process 510, the received data is sent across a first network of the computing platform according to the determined route.

Figure 6:
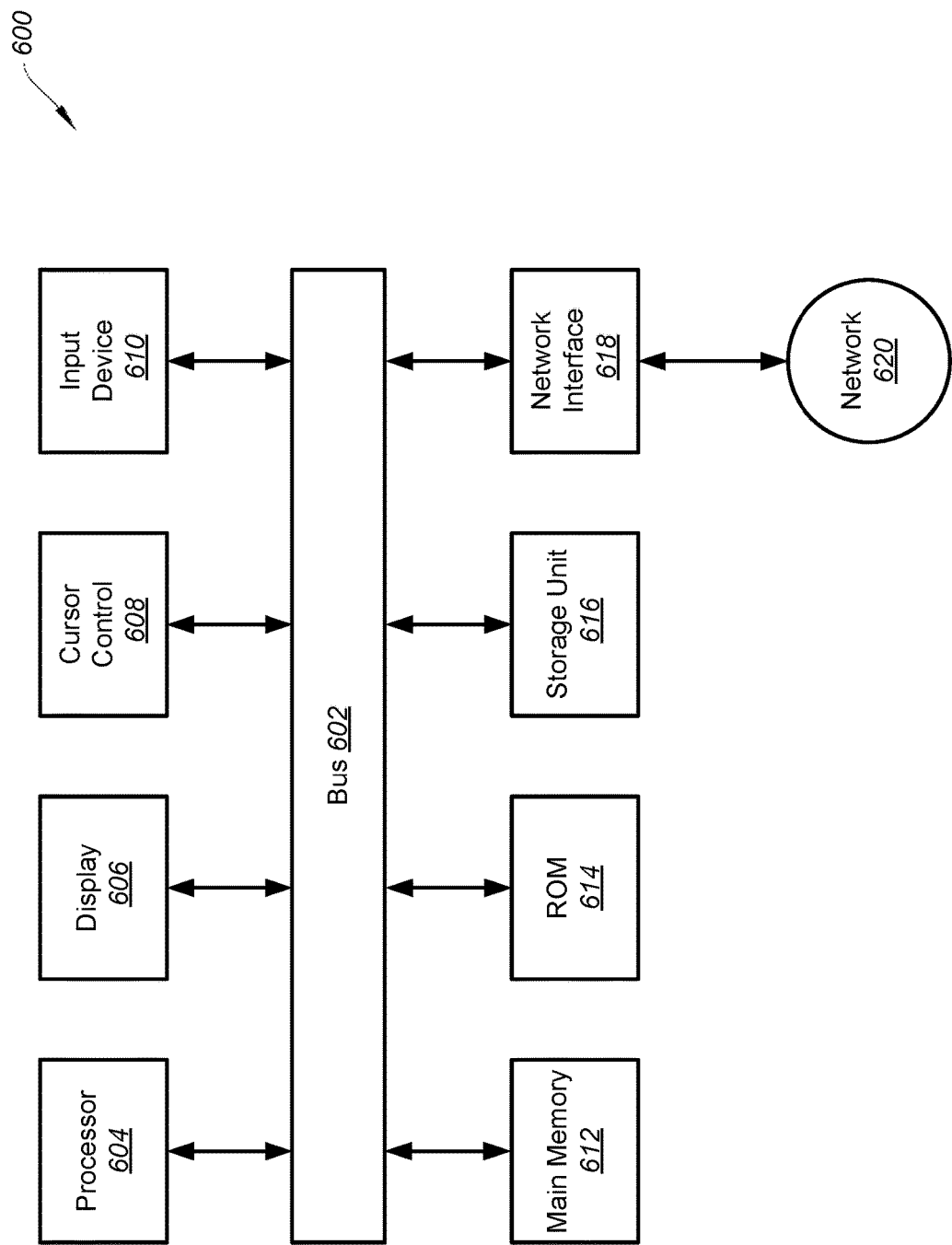
FIG. 6 is a simplified diagram showing a computing system for implementing a system for isolating network traffic of multiple users across a network of a computing platform according to one embodiment of the present invention.

FIG. 6 is a simplified diagram showing a computing system for implementing a system for isolating network traffic of multiple users across a network of a computing platform according to one embodiment of the present invention. This diagram is merely an example, which should not unduly limit the scope of the claims. One of ordinary skill in the art would recognize many variations, alternatives, and modifications. The computing system 600 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the method 500 are performed by the computing system 600. In some examples, the bus 602 is coupled to the processor 604, the display 606, the cursor control component 606, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For examples, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control 608 (e.g., a mouse, a trackball, or cursor direction keys) is configured to communicate additional information and commands (e.g., to control cursor movements on the display 606) to the processor 604.

According to some embodiments, a method for isolating network traffic of multiple users across a network of a computing platform includes receiving data at a networking device of a computing platform. The networking device includes a plurality of routing tables. Each routing table of the plurality of routing tables is associated with a different user of multiple users of the computing platform. The method further includes identifying a user of the multiple users based at least in part on the received data. In response to identifying the user of the multiple users based at least in part on the received data, a routing table of the plurality of routing tables is identified based at least in part on the identified user. The method further includes determining a route from the identified routing table based at least in part on the received data, and sending the received data across a network of the computing platform according to the determined route. The method is performed using one or more processors. For example, the method is implemented according to at least FIG. 1, FIG. 2, FIG. 3, FIG. 4 and/or FIG. 5.

In some examples, the received data includes a unique user identification number related to the identified user, and the identified routing table is associated with the unique user identification number. In certain examples, a first routing table of the plurality of routing tables includes a first route. A second routing table of the plurality of routing tables includes a second route, and the first route and the second route are different. In other examples, a first routing table of the plurality of routing tables includes a first route. A second routing table of the plurality of routing tables includes a second route, and the first route and the second route are the same and relate to a default route.

In certain examples, the sending the received data across a first network of the computing platform according to the determined route includes: tagging the received data for sending across a broadcast domain of a plurality of broadcast domains; and sending the received data across the broadcast domain associated with the identified user. The broadcast domain is associated with the identified user. Each broadcast domain of the plurality of broadcast domains is isolated from any other broadcast domain of the plurality of broadcast domains and is associated with a different user of the multiple users of the computing platform. In other examples, the broadcast domains include virtual local area networks.

In some examples, the broadcast domains are isolated from each other at a data link layer of the first network. In certain examples, at least two broadcast domains of the isolated broadcast domains are connected through a network layer of the first network. The at least two broadcast domains are associated with the identified user. In other examples, the sending the received data across a first network of the computing platform according to the determined route includes: encapsulating frames of the received data for sending from a first broadcast domain of a plurality of broadcast domains to a second broadcast domain of the plurality of broadcast domains; and sending the encapsulated frames of the received data from the first broadcast domain to the second broadcast domain using a network layer of the first network. The first broadcast domain and the second broadcast domain are associated with the identified user. Each broadcast domain of the plurality of broadcast domains is isolated from any other broadcast domain of the plurality of broadcast domains at a data link layer of the first network. Each broadcast domain of the plurality of broadcast domains is associated with a different user of the multiple users of the computing platform. Each encapsulated frame includes a first network address associated with the first broadcast domain and a second network address associated with the second broadcast domain.

In certain examples, the first broadcast domain includes a first domain identification number; the second broadcast domain includes a second domain identification number; and the first domain identification number and the second domain identification number are the same and associated with a unique user identification number related to the identified user. In other examples, the method further includes: configuring a first routing table of the plurality of routing tables by using a second network. The first network includes one or more first network connections and one or more first network interfaces. The second network includes one or more second network connections and one or more second network interfaces. The one or more first network connections and the one or more second network connections are different. The one or more first network interfaces and the one or more second network interfaces are different.

In some examples, the configuring a first routing table of the plurality of routing tables by using a second network include: copying one or more routes from a second routing table of the plurality of routing tables into the first routing table. The first routing table is associated with a first user of the multiple users of the computing platform. The second routing table is associated with a second user of the multiple users of the computing platform, and the first user and the second user are different According to certain embodiments, a system for isolating network traffic of multiple users across a network of a computing platform includes a plurality of hosts; a networking device, and a network connecting the plurality of hosts and the networking device. The networking device includes a network layer and a plurality of routing tables. Each routing table of the plurality of routing tables is associated with a different user of multiple users of a computing platform. The networking device is configured to: receive data at the network layer from a first host of the plurality of hosts; identify a user of the multiple users based at least in part on the received data; in response to identifying the user of the multiple users based at least in part on the received data, identify a routing table of the plurality of routing tables based at least in part on the identified user; determine a route from the identified routing table based at least in part on the received data; and send the received data according to the determined route across the network to a second host of the plurality of hosts. For example, the system is implemented according to at least FIG. 1, FIG. 2, FIG. 3, and/or FIG. 4.

In some examples, the received data includes a unique user identification number related to the identified user, and the identified routing table is associated with the unique user identification number. In certain examples, a first routing table of the plurality of routing tables includes a first route. A second routing table of the plurality of routing tables includes a second route, and the first route and the second route are different. In other examples, a first routing table of the plurality of routing tables includes a first route. A second routing table of the plurality of routing tables includes a second route, and the first route and the second route are the same and relate to a default route. In some examples, the system further includes a plurality of broadcast domains. Each broadcast domain is associated with one or more hosts of the plurality of hosts and connecting the one or more hosts. The networking device is further configured to: tag the received data for sending across a broadcast domain of the plurality of broadcast domains; and send the received data across the broadcast domain associated with the identified user. The broadcast domain is associated with the identified user. Each host of the plurality of hosts is associated with only one broadcast domain of the plurality of broadcast domains. Each broadcast domain of the plurality of broadcast domains is isolated from any other broadcast domain of the plurality of broadcast domains. Each broadcast domain of the plurality of broadcast domains is associated with a different user of the multiple users of the computing platform.

According to some embodiments, a network layer for isolating network traffic of multiple users of a computing platform is provided. The network layer is configured to: identify a user of multiple users of a computing platform based at least in part on network data send across a network of the computing platform; in response to identifying the user of the multiple users based at least in part on the network data send across the network of the computing platform, identify a routing table of a plurality of routing tables based at least in part on the identified user. Each routing table of the plurality of routing tables are associated with a different user of the multiple users of the computing platform. The network layer is further configured to: determine a route from the identified routing table based at least in part on the network data; and route the network data according to the determined route across the network of the computing platform. For example, the network layer is implemented according to at least FIG. 4, and/or FIG. 5.

In some examples, a first routing table of the plurality of routing tables includes a first route. A second routing table of the plurality of routing tables includes a second route, and the first route and the second route are different. In certain examples, a first routing table of the plurality of routing tables includes a first route. A second routing table of the plurality of routing tables includes a second route, and the first route and the second route are the same and relate to a default route.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for isolating network traffic of multiple users across a network of a multi-tenant computing platform, the method comprising:
   receiving data from an application associated with a user of the multi-tenant computing platform at a networking device of the multi-tenant computing platform, the networking device configured to connect to a plurality of hosts within the computing platform, the network device including a plurality of routing tables, each routing table of the plurality of routing tables being associated with a respective user of multiple users of the multi-tenant computing platform;
   identifying a first user of the multiple users based at least in part on the received data;
   identifying a first routing table of the plurality of routing tables based at least in part on the first user;
   determining a route from the first routing table based at least in part on the received data;
   sending the received data across a first network of the multi-tenant computing platform according to the determined route; and
   configuring a second routing table of the plurality of routing tables by using a second network different from the first network by at least:
      copying one or more routes from the first routing table into the second routing table in response to the first user granting permission for a second user different from the first user;
   wherein:
      the first routing table is associated with the first user of the multiple users of the multi-tenant computing platform;
      the second routing table is associated with a second user of the multiple users of the computing platform; and
   wherein the method is performed using one or more processors.

2. The method of claim 1 wherein:
   the received data includes a unique user identification number related to the first user; and
   the first routing table is associated with the unique user identification number.

3. The method of claim 1 wherein:
   the first routing table of the plurality of routing tables includes a first route;
   the second routing table of the plurality of routing tables includes a second route; and
   the first route and the second route are different.

4. The method of claim 1 wherein:
   the first routing table of the plurality of routing tables includes a first route;
   the second routing table of the plurality of routing tables includes a second route; and
   the first route and the second route are the same and relate to a default route.

5. The method of claim 1 wherein the sending the received data across a first network of the multi-tenant computing platform according to the determined route includes:
   tagging the received data for sending across a broadcast domain of a plurality of broadcast domains, the broadcast domain being associated with the first user; and
   sending the received data across the broadcast domain associated with the first user;
   wherein each broadcast domain of the plurality of broadcast domains is isolated from any other broadcast domain of the plurality of broadcast domains and is associated with a different user of the multiple users of the multi-tenant computing platform.

6. The method of claim 5 wherein the plurality of broadcast domains include virtual local area networks.

7. The method of claim 5 wherein the plurality of broadcast domains are isolated from each other at a data link layer of the first network.

8. The method of claim 7 wherein at least two broadcast domains of the plurality of broadcast domains are connected through a network layer of the first network, the at least two broadcast domains being associated with the first user.

9. The method of claim 1 wherein the sending the received data across a first network of the multi-tenant computing platform according to the determined route includes:
   encapsulating one or more frames of the received data for sending from a first broadcast domain of a plurality of broadcast domains to a second broadcast domain of the plurality of broadcast domains, the first broadcast domain and the second broadcast domain being associated with the first user; and
   sending the encapsulated frames of the received data from the first broadcast domain to the second broadcast domain using a network layer of the first network;
   wherein:
      each broadcast domain of the plurality of broadcast domains is isolated from any other broadcast domain of the plurality of broadcast domains at a data link layer of the first network;
      each broadcast domain of the plurality of broadcast domains is associated with a different user of the multiple users of the multi-tenant computing platform; and
      the one or more frames include a first network address associated with the first broadcast domain and a second network address associated with the second broadcast domain.

10. A system for isolating network traffic of multiple users across a network of a multi-tenant computing platform, the system comprising:
    a plurality of hosts within the multi-tenant computing platform;
    a networking device connected to the plurality of hosts; and a plurality of broadcast domains, each broadcast domain being associated with one or more hosts of the plurality of hosts and connecting the one or more hosts;

wherein the networking device includes a plurality of routing tables, each routing table of the plurality of routing tables being associated with a different user of multiple users of the multi-tenant computing platform, each routing table including a route to provide data to at least one of the plurality of hosts within the multi-tenant computing platform;

wherein the networking device is configured to:

receive data from a first host of the plurality of hosts;

identify a user of the multiple users based at least in part on the received data;

tag the received data for sending across a broadcast domain of the plurality of broadcast domains, the broadcast domain being associated with the identified user; and send the received data across the broadcast domain associated with the identified user;

wherein:

each host of the plurality of hosts is associated with only one broadcast domain of the plurality of broadcast domains;

each broadcast domain of the plurality of broadcast domains is isolated from any other broadcast domain of the plurality of broadcast domains; and each broadcast domain of the plurality of broadcast domains is associated with a different user of the multiple users of the multi-tenant computing platform.

11. The system of claim 10 wherein the networking device is further configured to identify a routing table of the plurality of routing tables based at least in part on the identified user, wherein the received data includes a unique user identification number related to the identified user; and wherein the identified routing table is associated with the unique user identification number.

12. The system of claim 10 wherein:

a first routing table of the plurality of routing tables includes a first route;

a second routing table of the plurality of routing tables includes a second route; and the first route and the second route are different.

13. The system of claim 10 wherein:

a first routing table of the plurality of routing tables includes a first route;

a second routing table of the plurality of routing tables includes a second route; and the first route and the second route are the same and relate to a default route.

14. The system of claim 10 wherein the plurality of broadcast domains are isolated from each other at a data link layer.

15. The system of claim 10 wherein at least two broadcast domains of the plurality of broadcast domains are connected through a network layer, the at least two broadcast domains being associated with the identified user.

16. An apparatus for isolating network traffic of multiple users of a multi-tenant computing platform, the apparatus comprising:

a plurality of routing tables, each routing table of the plurality of routing tables being associated with a different user of multiple users of the multi-tenant computing platform and each routing table including a route to provide data to at least one of a plurality of hosts within the multi-tenant computing platform;

the apparatus is configured to configure a first routing table of the plurality of routing tables by at least:

copying one or more routes from a second routing table of the plurality of routing tables into the first routing table in response to a second user granting permission for a first user;

wherein:

the first routing table is associated with the first user of the multiple users of the multi-tenant computing platform;

the second routing table is associated with the second user of the multiple users of the computing platform; and the first user is different from the second user.

17. The apparatus of claim 16 wherein:

a first routing table of the plurality of routing tables includes a first route;

a second routing table of the plurality of routing tables includes a second route; and the first route and the second route are different.

18. The apparatus of claim 16 wherein:

a first routing table of the plurality of routing tables includes a first route;

a second routing table of the plurality of routing tables includes a second route; and the first route and the second route are the same and relate to a default route.

19. The apparatus of claim 16 wherein the apparatus is further configured to:

identify a user of the multiple users of the multi-tenant computing platform based at least in part on network data sent across a network of the multi-tenant computing platform;

identify a routing table of a plurality of routing tables based at least in part on the identified user;

determine a route from the identified routing table based at least in part on the network data; and route the network data according to the determined route across the network of the multi-tenant computing platform.

20. The apparatus of claim 16, wherein the apparatus is further configured to:

identify a user of the multiple users of the multi-tenant computing platform based at least in part on network data sent across a network of the multi-tenant computing platform;

identify a broadcast domain of a plurality of broadcast domain based at least in part on the identified user; and send the network data across the identified broadcast domain, wherein each broadcast domain of the plurality of broadcast domains is isolated from any other broadcast domain of the plurality of broadcast domains and is associated with a different user of the multiple users of the multi-tenant computing platform.

* * * * *